United States Patent [19]

Montgomery

[11] Patent Number: 5,401,696

[45] Date of Patent: Mar. 28, 1995

[54] CERAMIC COMPOSITE

[75] Inventor: Lionel C. Montgomery, Bay Village, Ohio

[73] Assignee: Advanced Ceramics Corporation, Lakewood, Ohio

[21] Appl. No.: 212,501

[22] Filed: Mar. 11, 1994

Related U.S. Application Data

[62] Division of Ser. No. 37,751, Mar. 26, 1993, Pat. No. 5,336,454.

[51] Int. Cl.$^6$ ............................................. C04B 35/58
[52] U.S. Cl. ...................................... 501/96; 501/98; 501/128
[58] Field of Search ........................... 501/96, 98, 128

[56] References Cited

U.S. PATENT DOCUMENTS

| | | | |
|---|---|---|---|
| 4,435,513 | 3/1984 | Komeya et al. | 501/96 |
| 5,120,683 | 6/1992 | Shaffer | 501/96 |
| 5,134,098 | 7/1992 | Shaffer | 501/96 |
| 5,286,685 | 2/1994 | Schoennahl et al. | 501/96 X |
| 5,308,044 | 5/1994 | Nakashima et al. | 501/96 X |

*Primary Examiner*—Karl Group
*Attorney, Agent, or Firm*—Eugene Lieberstein; Michael N. Meller

[57] ABSTRACT

A ceramic composition and method for making ceramic composites having superior erosion and corrosion resistance to molten metal. The composite includes mullite, aluminum nitride and boron nitride in combination. The composite may be hot pressed or cold formed and pressureless sintered into a desired shape.

3 Claims, No Drawings

CERAMIC COMPOSITE

This is a division of application Ser. No. 08/037,751, filed Mar. 26, 1993, now U.S. Pat. No. 5,336,454.

FIELD OF THE INVENTION

This invention relates to a ceramic composite and to a method of making ceramic composites having superior erosion and corrosion resistance to molten metal.

BACKGROUND OF THE INVENTION

In the continuous casting of molten steel a break ring is used to provide a thermal barrier at the interface between the furnace nozzle and the mold. The break ring must possess thermal shock resistance, stability at high temperature and must be corrosion and erosion resistant to the high temperature molten steel which flows through the break ring into the mold. The ability to resist attack from the molten metal passing through the break ring as it flows into the extrusion mold determines the tonnage of metal that can be cast in a single operation without interruption of the process to replace the break ring. Cost is another important factor which requires the break ring to be machinable.

Boron nitride is a conventional material used in the fabrication of break rings. It is desirable because of its good thermal shock resistance, stability at high temperature and machinability. However, it lacks good abrasion resistance which subjects it to high wear rates when exposed to flowing molten metal. Boron nitride has also been combined to form a ceramic composite with alumina ($Al_2O_3$) which is also used in molten metal applications due to its hardness, abrasion resistance and chemical stability. In addition, boron nitride has been separately combined with aluminum nitride (AlN), titanium diboride($TiB_2$), mullite($3Al_2O_3$—$2SiO_2$) and with aluminum nitride and titanium diboride. Other materials have also been combined with boron nitride such as silicon nitride to form a composite for use as a break ring. However a silicon nitride composite is not readily machinable. The boron nitride composites BN—AlN, BN—$3Al_2O_3$—$2SiO_2$, and BN—$TiB_2$—AlN are readily machinable and are commercially available from the Praxair Inc., advanced ceramics division, located in Cleveland, Ohio. The mechanical and physical properties of $Al_2O_3$—BN and mullite-BN composites are described in Lewis et al in "Microstructure and Thermomechanical Properties in Alumina and Mullite Boron Nitride Particulate Ceramic-Ceramic Composites", Ceram. Eng. Sci. Proc. 2: 719–727 (Nos.7–8,1981) which also includes data on the thermal shock resistance of such composites. In addition, U.S. Pat. No. 4,997,605 discloses a hot pressed ceramic composite formed from a blend of fused zirconia mullite and boron nitride which is indicated as having good resistance to thermal shock and reasonably good erosion and corrosion resistance to metal alloys.

The above identified ceramic composites of boron nitride which are readily machinable are all currently formed by hot pressing and have substantially similar corrosion and erosion resistant properties under test conditions which simulate the process conditions of a continuous casting operation. The composite formulation of any of the known boron nitride composites may be adjusted to increase its corrosion and erosion resistance but only as a tradeoff against other properties particularly machinability.

SUMMARY OF INVENTION

In accordance with the present invention it has been discovered that a ceramic composite containing boron nitride, mullite and aluminum nitride, in combination, yields a substantial increase in corrosion and erosion resistance to attack from molten metals which is completely unexpected in comparison to the corrosion and erosion resistance of the known boron nitride composites BN—AlN and BN—$3Al_2O_3$—$2SiO_2$ as well as that of boron nitride alone. It was further discovered in accordance with the present invention that the a composite containing boron nitride, mullite and aluminum nitride, in combination, is readily machinable and may be fabricated by either hot pressing or cold forming. When formulated in accordance with the present invention the ceramic composite of BN—AlN—$3Al_2O_3$—$2SiO_2$ has a high resistance to thermal shock and provides superior corrosion/erosion resistance to molten metals relative to the corrosion/erosion resistance of all presently known readily machinable boron nitride composites under similar operating conditions. When the boron nitride composite of the present invention is hot pressed its corrosion and erosion resistance corresponds to a reduction in mass of less than one (1) percent per hour under simulated continuous casting operating conditions. Alternatively, if the ceramic composite BN—AlN—$3Al_2O_3$—$2SiO_2$ is cold formed in accordance with the present invention its corrosion/erosion resistant properties are as good, comparitively, to the corrosion/erosion properties of known readily machinable hot pressed boron nitride composites.

The ceramic composite of the present invention comprises, in combination, 18.5 to 29.0 weight percent mullite, 35 to 18 weight percent aluminum nitride, balance boron nitride in a minimum concentration of at least about 40 percent by weight.

The present invention is also directed to a method for cold forming a ceramic composite comprising the steps of:

(a) blending a mixture comprising from 18.5 to 29.0 wt % mullite, 35 to 18 wt % aluminum nitride and at least 40 wt % boron nitride;

(b) milling the blend to an average particle size of less than about 5 microns;

(c) coating the particles with a resinous lubricant composed of a vinyl chloride-vinyl acetate resin dissolved in an organic solvent;

(d) compressing the particles into a cold formed shape; and (e) pressureless sintering the cold formed shape.

Another aspect of the present invention is a method for producing a hot pressed boron nitride ceramic composite comprising the steps of:

(a) blending a mixture comprising from 18.5 to 29 wt % mullite, 35 to 18 wt % aluminum nitride and at least 40 wt % boron nitride;

(b) heating and compressing the blended mixture in a mold at a temperature of between 1650° C. and 1900° C. and at a pressure of between 1800 and 2500 psi; and (c) cooling the composite at a gradually decreasing pressure so that fracture of the composite is prevented.

DETAILED DESCRIPTION OF THE INVENTION

The ceramic of the present invention is composed of a composite formed from a mixture of the ceramic materials boron nitride(BN), mullite($3Al_2O_3$—$2SiO_2$), and aluminum nitride (AlN). A densification aid such as CaO should preferably be added to the mixture. Mullite is an orthorhombic homogeneous solid solution of alumina in sillimanite and is commercially available in powder form having an average particle size of less than 10 microns. Boron nitride and aluminum nitride are also commercially available in powder form. Each of the materials in the composite may vary in the following proportion by weight:

| Material | Maximum Range | Preferred Range |
| --- | --- | --- |
| CaO | 1% to 5% | 3.0% to 2.0% |
| AlN | 18% to 35% | 18.5% to 294 |
| $3Al_2O_3$—$2SiO_2$ | 30% to 18% | 18.5% to 294 |
| BN | balance | 60% to 40% |

In order to form a homogeneous mixture a portion of the powders should first be preblended in a mixer such as a V-blender using preferably all of the CaO. The preblend should preferably constitute 25% of the total mixture. The other 75% of the preblended mixture should preferably constitute relatively equal amounts of BN, $3Al_2O_3$—$2SiO_2$, and AlN. The preblend should then be mixed for at least 30 minutes preferably with an intensifier bar. After the preblend is prepared the V-blender should then be loaded to produce the main blend for the composite in a systematic fashion preferably by layering the V-blender with successive layers of material as is well known to those skilled in the art. The preferred loading of the V-blender in the preparation of the main blend may be carried out as follows:

1. Add substantially ½ of the balance of BN.
2. Add substantially 1/6 of the preblend.
3. Add ½ of the balance of AlN.
4. Add 1/6 preblend.
5. Add ½ balance of $3Al_2O_3$—$2SiO_2$.
6. Add 1/6 preblend.
7. Repeat steps 1–6.
8. The V-blender should be operated for at least 60 minutes preferably with an intensifier bar.

To hot press the material the main powder blend may be added directly to a graphite mold for densification. However, the main powder blend should at first preferably be prepressed into compacts and granulated before being added to the graphite mold. Densification by hot-pressing takes place as a function of temperature and pressure. Hot pressing may be carried out at a temperature of about 1800° C. and a pressure of 2200 psi with a hold time at maximum conditions for two hours. The temperature should rise at a heat rate of typically about 300° C./hour and pressure should be applied gradually reaching full pressure at a temperature of about 1000° C. Pressure can be retained at maximum during cooling to about 1000° C. and should then drop gradually with further cooling. The raw material powders used for both hot pressing and cold forming should have a purity of at least 95% with the boron nitride, mullite and calcium oxide purity of preferably over 97% and with the boron nitride and aluminum nitride of low oxygen concentration. The boron nitride particles should have an average size of less than 1 micron with the other components of the mixture having a particle size of less than 10 microns. Typical properties for the hot pressed composite both with and without calcium oxide is shown in the following two

TABLE I

A Few Properties of Hot-Pressed BN-AlN-$3Al_2O_3$.$2SiO_2$

| Composition: | 55.64% BN-20.93% AlN - 20.93% $3Al_2O_3$.$2SiO_2$ + 2.5% CaO |
| --- | --- |
| Fabrication: | Hot-Pressed 1800° C.–2200 psi, two-hour hold, pressure decayed gradually to 0 at ~1600° C. and billet ejected into mold taper at 1100° C. |

| | Test Sample Direction to Hot-Pressing | |
| --- | --- | --- |
| Properties | Parallel | Perpendicular |
| Density, % Theoretical | 92.2 | 92.2 |
| Flexure, psi: | | |
| 25° C. | 10,400 | 15,600 |
| 1500° C. | 4,400 | 6,500 |
| Sonic Modulus, psi × $10^6$: 25° C. | 5.0 | 8.0 |
| CTE, in./inc/°C. × $10^{-6}$ | 5.2 | 5.6 |
| Thermal Conductivity, Watts/M °K. | 11.0 | 14.0 |

Erosion/Corrosion[1] in Liquid Metals as Percent Reduction in Diameter of Test Sample per Hour:

| Metal | °C. | Test Sample Percent Reduction Per Hour |
| --- | --- | --- |
| 304 Stainless Steel | 1535 | 0.70 |
| Low-Carbon Steel | 1550 | 0.17 |
| Gray Cast Iron | 1480 | 0 |
| Ductile Cast Iron | 1480 | 0 |

(1) Test sample ½ in. diameter × 2.0 in. rotating at 60 rpm for exposure time of four hours

TABLE II

A Few Properties of Hot-Pressed BN-AlN-$3Al_2O_3$.$2SiO_2$ (No CaO) Composition: 57.06% BN - 21.47% AlN - 21.47% Mullite

| | Test Sample Direction to Hot-Pressing | |
| --- | --- | --- |
| | Parallel | Perpendicular |
| Density, g/cc | 1.70 | 1.69 |
| % Th. | 66.93 | 66.54 |
| % Porosity | 33.07 | 33.46 |
| Flexure Strength, psi | | |
| 25° C. | 1598 | 1820 |
| 1500° C. | 1874 | 2130 |
| Sonic Modulus, psi × $10^6$ | 0.83 | 1.08 |

Erosion/Corrosion, Percent Reduction in Diameter of Test Sample per Hour

| % Reduction | Metal |
| --- | --- |
| 1.66 | L.C. Steel (1500° C.) |
| 0.27 | 304 S. S. (1535° C.) |
| 0.83 | Grey Cast Iron (1480° C.) |

(1) ½ In. Diameter × 2 In. Long Sample, 60 RPM for four hours

A comparison of the corrosion/erosion rate of the composite of the present invention to the corrosion/erosion rate of boron nitride and composites of boron nitride-aluminum nitride and boron nitride-mullite is shown in the following table III:

TABLE III

Comparison of the Erosion/Corrosion Rate of Commercial BN Composites in Selected Metal Compared to BN Invention Composite

| | Grades Hot-Pressed | | | Invention |
|---|---|---|---|---|
| Component | HBR | ALN-60 | MBN | MBA-Z |
| BN | 98.0 | 56.0 | 50.0 | 55.64 |
| AlN | — | 38.0 | — | 20.93 |
| 3Al$_2$O$_3$.2SiO$_2$ | — | — | 50.0 | 20.93 |
| CaO | — | 6.0 | — | 2.5 |
| CaF$_2$ | 2.0 | — | — | — |
| Erosion/corrosion in Molten Metals as Percent Reduction in Diameter of Test Sample (½ In. Diameter × 2 In. Long) per Hour When Samples are Exposed to Molten Metals at 60 RPM for Four Hours: | | | | |
| °C.  Metals | | | | |
| 1535  304 Stainless Steel | ~35.0 | 2.30 | 3.20 | 0.70 |
| 1550  Low-Carbon Steel | ~15.0 | 2.10 | 2.15 | 0.14 |
| 1480  Grey Cast Iron | 0.167 | — | 0.138 | 0 |
| 1480  Ductile Cast Iron | 0.50 | — | 0 | 0 |

The boron nitride composite of the present invention can be cold formed and pressureless sintered to result in a strong thermally stable stock that offers excellent resistance to molten metals. The preferred cold forming process involves the following steps:

a. Milling the V-blended main blend, which is preferably blended as indicated earlier in connection with hot pressing, to a predetermined average particle size of 3–5 microns (microtrac).

b. Coating the particles with a lubricant of a resin material formed from vinyl chloride and acetate.

c. Cold-forming the particles into the desired shape.

d. Pressureless sintering the cold-pressed article under an inert atmosphere at a temperature of between about 1800° C. and 1975° C., preferably about 1940° C., to produce a strong structure.

The above identified milling step is preferably wet milled in an organic solvent in which the vinyl chloride and vinyl acetate/polyvinyl acetate is dissolved. The preferred solvent is a ketone such as methylethylketone (MEK). By wet milling in a solvent the particles will automatically be coated as indicated above in step "b". Alternatively, the coating could be put on by spray-drying methods. The wet milled powder is dried and crushed to size and screened to an agglomerated size of between −65+325 mesh. The cold forming step "c" can be conducted at pressures such as 35,000 psi in well lubricated metal dies, isostatically molded or slip cast as is well known to those skilled in the art. The cold formed article has a green density of about 55 to 60% theoretical which is substantially uniform throughout its volume. Moreover, if the cold-formed shape is cured at a temperature of about 120° to 160° C., preferably at about 150° C., machining of the product can be readily carried out.

To avoid the formation of cracks in the cold formed product during the step of pressureless sintering the heating of the product should be uniform. This may be accomplished by enclosing but not confining the green shape in a graphite container to permit the formed shape to freely expand or shrink during the heating cycle. Heat rate depends upon cross sectional size of the product but should not exceed about 400° C./hour, preferably about 200° C./hour to about 1900° C. with no more than a 10% temperature drift for about a holding period of 3 hours. The cold formed articles of BN—AlN—3Al$_2$O$_3$—2SiO$_2$-CaO with a composition of 55.64% BN—20.93% APN—20.93% mullite—2.5% CaO bond during pressureless sintering to produce strong machinable stock with densities in excess of 70% of theoretical, and the structure is not substantially wet by liquid 304 stainless steel or low carbon steel. For example, the reduction in the diameter of test samples (½ in. diameter×2 in. long) per hour rotating in liquid metal at 60 rpm for four hours are shown below.

| | Typical Range Reduction | Temperature °C. |
|---|---|---|
| 304 Stainless Steel | 1.6–1.8 | 1535 |
| Low-Carbon Steel | 1.6–2.1 | 1550 |

What we claim is:

1. A ceramic composite which is corrosion and erosion resistant to molten metal comprising, in combination, 18.5 to 29.0 weight percent mullite, 35 to 18 weight percent aluminum nitride, balance boron nitride in a minimum concentration of at least about 40 percent by weight.

2. A ceramic composite as defined in claim 1 comprising the addition of calcium oxide in a range of between 1 to 5 wt % based upon the weight of the entire composite.

3. A ceramic composite as defined in claim 2 comprising 18.5 to 29 wt % mullite, 18.5 to 29 wt % aluminum nitride, 3 to 2 wt % calcium oxide and between 60 and 40 wt % boron nitride.

* * * * *